(12) United States Patent
Xu et al.

(10) Patent No.: US 12,259,553 B2
(45) Date of Patent: Mar. 25, 2025

(54) GEOMETRICAL WAVEGUIDE ILLUMINATOR AND DISPLAY BASED THEREON

(71) Applicant: META PLATFORMS TECHNOLOGIES, LLC, Menlo Park, CA (US)

(72) Inventors: Miaomiao Xu, Redmond, WA (US); Brian Wheelwright, Sammamish, WA (US); Fenglin Peng, Redmond, WA (US); Ying Geng, Bellevue, WA (US); Changwon Jang, Bellevue, WA (US); Maxwell Parsons, Seattle, WA (US); Sihui He, Sunnyvale, CA (US); Jacques Gollier, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 527 days.

(21) Appl. No.: 17/666,227

(22) Filed: Feb. 7, 2022

(65) Prior Publication Data
US 2023/0107434 A1  Apr. 6, 2023

Related U.S. Application Data

(60) Provisional application No. 63/295,299, filed on Dec. 30, 2021, provisional application No. 63/251,332, filed on Oct. 1, 2021.

(51) Int. Cl.
*G02B 27/01* (2006.01)
*G02B 27/14* (2006.01)
*G02B 27/28* (2006.01)

(52) U.S. Cl.
CPC ......... *G02B 27/0172* (2013.01); *G02B 27/14* (2013.01); *G02B 27/283* (2013.01)

(58) Field of Classification Search
CPC ........ G02B 27/0172; G02B 2027/0125; G02B 27/017; G02B 27/14; G02B 27/283
See application file for complete search history.

(56) References Cited

U.S. PATENT DOCUMENTS

2008/0278658 A1  11/2008  Kim et al.
2015/0226909 A1  8/2015  Li et al.
(Continued)

FOREIGN PATENT DOCUMENTS

WO  2020115735 A1  6/2020

OTHER PUBLICATIONS

International Preliminary Report on Patentability for International Application No. PCT/US2022/045516, mailed Apr. 11, 2024, 7 pages.
(Continued)

*Primary Examiner* — Ryan D Howard
(74) *Attorney, Agent, or Firm* — Greenberg Traurig, LLP

(57) ABSTRACT

An illuminator for illuminating a display panel includes a lightguide with an array of buried slanted bulk reflectors that out-couple portions of the light beam propagating in the lightguide through one of the lightguide surfaces. Polarization beam-splitting slanted surfaces may be used to provide polarized output. Such an illuminator may be used with a reflective display panel operating by polarization. The beam-splitting slanted surfaces operate as a polarizer, providing polarized illuminating light. The light reflected by the reflective panel may propagate back through the illuminator, and the polarization beam-splitting slanted surfaces may operate also as analyzer.

20 Claims, 12 Drawing Sheets

(56) References Cited

U.S. PATENT DOCUMENTS

2020/0150332 A1 5/2020 Nakamura et al.
2020/0355923 A1* 11/2020 Potnis .................... G02B 27/14

OTHER PUBLICATIONS

International Search Report and Written Opinion for International Application No. PCT/US2022/045516, mailed Feb. 6, 2023, 8 pages.

* cited by examiner

GEOMETRICAL WAVEGUIDE ILLUMINATOR AND DISPLAY BASED THEREON

REFERENCE TO RELATED APPLICATIONS

This application claims priority from U.S. Provisional Patent Application No. 63/251,332 entitled "Geometrical Waveguide Illuminator" and filed on Oct. 1, 2021, and U.S. Provisional Patent Application No. 63/295,299 entitled "Geometrical Waveguide Illuminator and Display Based Thereon" and filed on Dec. 30, 2021, both applications being incorporated herein by reference in their entireties.

TECHNICAL FIELD

The present disclosure relates to illuminators, visual display devices, and related components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Head-mounted display devices can benefit from compact and efficient components. In particular, head-mounted display devices using reflective or transmissive display panels to generate imagery to be displayed to the wearer can benefit from compact and efficient light sources and illuminators for illuminating the display panels.

BRIEF DESCRIPTION OF THE DRAWINGS

Exemplary embodiments will now be described in conjunction with the drawings, in which.

DETAILED DESCRIPTION

Figure 1:
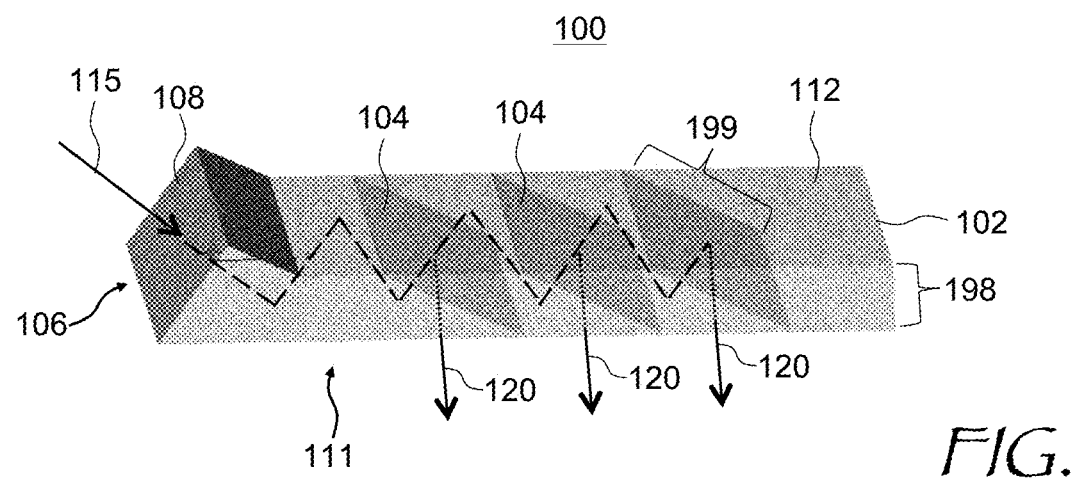
FIG. 1 is a three-dimensional view of an illuminator of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, FIGS. 4A-4D, and FIGS. 7A-7B, similar number refer to similar elements. Also in FIGS. 2, 3, FIGS. 5A-5B, FIGS. 6A-6C, and FIG. 8, similar number refer to similar elements.

In accordance with the present disclosure, a geometrical waveguide may be used to illuminate a display panel including an array of reflective or transmissive pixels, e.g. a liquid crystal (LC) array of reflective or transmissive pixels. A geometrical waveguide may be made in form of a thin slab or plate of a transparent material having opposed outer surfaces for guiding light in the slab by a series of zigzag internal reflections from the outer surfaces of the slab. The slab includes a set of approximately parallel slanted partial reflectors, i.e. translucent bulk mirrors, forming an acute angle with the opposed outer surfaces. When the light propagating in the slab impinges onto the slanted partial reflectors, portions of the light are out-coupled from the slab, forming a broad illuminating light beam. Requirements for parallelism of the illuminating light beam are comparatively relaxed, enabling inexpensive production of geometrical waveguide illuminators. Such illuminators are not color selective and very compact. The term "geometrical waveguide" distinguishes from pupil-replicating waveguides equipped with diffraction grating based out-couplers. The out-coupling mechanism in the geometrical waveguide is reflection, not diffraction, and is therefore not color-selective, i.e. all the wavelengths are out-coupled at the same angle.

In accordance with the present disclosure, there is provided an illuminator for a display panel. The illuminator comprises a lightguide for propagating a light beam along a length dimension of the lightguide by a series of internal reflections from first and second opposed outer surfaces of the lightguide. The first and second surfaces are separated by a lightguide thickness dimension perpendicular to the length dimension. A first plurality of slanted partial bulk reflectors are disposed inside the lightguide for out-coupling portions of the light beam along the length dimension of the lightguide through the first surface. The out-coupled light beam portions form an output light beam for illuminating the display panel. The slanted partial reflectors of the first plurality may include polarization-selective reflectors for reflecting light at a first polarization and transmitting light at a second, orthogonal polarization. A linear transmission polarizer may be disposed proximate the second surface of the lightguide and configured to transmit light at the second polarization. The slanted partial bulk reflectors may extend from the first surface to the second surface of the lightguide.

In some embodiments, a diffuser is disposed upstream of the lightguide, for scattering the light beam within a predefined light cone. An apex angle of the light cone may be e.g. less than 4 degrees. A partial reflector may be buried in the lightguide and disposed at a distance from and parallel to the first and second opposed outer surfaces in an optical path upstream of the first plurality of slanted partial bulk reflectors, for splitting the light beam for increasing a spatial density of the light beam portions out-coupled by the first plurality of slanted partial bulk reflectors from the lightguide.

The illuminator may include a second plurality of slanted partial bulk reflectors disposed inside the lightguide upstream of the first plurality of slanted partial bulk reflectors, for expanding the light beam along a width dimension of the lightguide to obtain an expanded light beam and for directing the expanded light beam towards the first plurality of slanted partial bulk reflectors. The illuminator may include a tiltable reflector in an optical path upstream of the lightguide, for varying an angle of incidence of the light beam onto the lightguide. The lightguide may be quite thin, e.g. thinner than 0.5 mm. A width of the slanted partial bulk reflectors of the first plurality between the first and second opposed outer surfaces of the lightguide may be less than 0.7 mm. A reflectivity of at least some of the slanted partial bulk reflectors of the first plurality may be greater than 50%. The slanted partial bulk reflectors of the first plurality may be parallel to one another to within 0.5 degrees. At least some of the slanted partial bulk reflectors of the first plurality may be angled w.r.t. each other by at least 0.2 degrees.

In accordance with the present disclosure, there is provided a display device comprising a display panel comprising a substrate and a pixel array supported by the substrate, and an illuminator described above. The display device may include an ocular lens downstream of the pixel array. The ocular lens may be configured to convert an image in spatial domain displayed by the display panel into an image in angular domain downstream of the ocular lens, for observation by a user's eye downstream of the ocular lens.

In embodiments where the pixel array is reflective, the lightguide may be disposed between the display panel and the ocular lens. In operation, the light beam portions reflected by the plurality of slanted partial bulk reflectors may impinge onto the reflective pixel array, get reflected thereby, propagate back through the lightguide, and impinge onto the ocular lens. The reflective pixel array may be configured to controllably tune polarization of the impinging light beam portions from a first polarization state to a second, orthogonal polarization state. In such embodiments, the slanted reflectors may be polarization-selective, i.e. they may reflect light in the first polarization state and to transmit light in the second polarization state. A linear transmission polarizer may be disposed between the lightguide and the ocular lens.

In embodiments where the pixel array is transmissive, the display panel may be disposed between the lightguide and the ocular lens. In operation, the light beam portions reflected by the plurality of slanted polarization-selective reflectors may propagate through the substrate, through the transmissive pixel array, and impinge onto the ocular lens. In some embodiments, the display device further comprises a focusing element for forming an array of light spots from the out-coupled light portions downstream of the focusing element, such that in operation, an array of optical power density peaks is formed at the transmissive pixel array due to Talbot effect.

In accordance with the present disclosure, there is further provided a method for illuminating a display panel. The method comprises propagating a light beam in a lightguide along a length dimension by a series of internal reflections from first and second opposed outer surfaces of the lightguide. Portions of the light beam are out-coupled along the length dimension of the lightguide through the first surface using a plurality of slanted partial bulk reflectors inside the lightguide, forming an output light beam from the out-coupled light beam portions for illuminating the display panel.

In embodiments where the display panel is reflective, the method may further include reflecting the output light beam by the reflective display panel, and propagating the output light beam reflected by the reflective display panel through the lightguide.

Referring now to FIG. 1, an illuminator 100 includes a lightguide 102 having a plurality of internal reflectors 104, which are bulk partial reflectors, or in other words, translucent bulk mirrors. The lightguide 102 may be e.g. a slab or plate of a transparent material such as glass, plastic, an oxide, crystal, etc. The lightguide 102 has opposed first 111 and second 112 outer surfaces at a distance from one another equal to a lightguide thickness 198. A light beam 115 may be guided within the lightguide 102 by a series of internal reflections, e.g. total internal reflections, from the first 111 and second 112 opposed surfaces. The reflections occur from inside the lightguide 102. The slanted partial bulk reflectors 104 may extend continuously from the first 111 to the second 112 surfaces as illustrated.

The illuminator 100 may further have an in-coupler 106 including a slanted side surface 108 for receiving the light beam 115. The angle of reflection of light beam portions 120 is equal to angle of incidence of the light beam 115 onto the internal reflectors 104 according to a geometrical law of reflection. In many cases, the internal reflectors 104 are partial reflectors with gradually increasing reflectivity to offset gradually reducing optical power and to provide a uniform illuminating beam. The reflectivity of some of the internal reflectors 104 may exceed 50%; the last (most downstream) reflector 104 may even be a full reflector, with reflectivity close to 100%. The internal reflectors 104 may be polarization-selective reflectors, i.e. they may be polarization beam-splitting (PBS) surfaces or interfaces. The PBS inner reflectors may be useful for illuminating display panels operating by spatial-variant polarization tuning of impinging light. Such displays may include an array of individually controllable polarization-tuning pixels.

Due to the angle preserving property of the lightguide 102, the latter may be used to convey images in angular domain from the in-coupler 106 to an eyebox located below the first surface 111 in FIG. 1. For imaging applications, the output beam parallelism is crucial in preserving sharpness of the conveyed image, i.e. for improving modulation transfer function (MTF). In contradistinction, it is not necessary to preserve a parallelism of the light beam 115 in illumination applications. The lightguide 102 does not have to keep the beam parallelism to a high degree, and may output an expanding light beam at the parallel beam input. An expanding or diverging illuminating beam may be even a desired in some display configurations. Consequently, the tolerances of the parallelism of the first 111 and second 112 surfaces may be greatly relaxed to e.g. 0.1 degrees, 0.2 degrees, and even 0.5 degrees. No degradation of performance may be observed even when at least some of the slanted partial bulk reflectors of the first plurality are angled w.r.t. each other by 0.2 degrees or more.

For the same reason, the lightguide 102 may be made quite thin without concerns that the light beam 115 of a small diameter to fit in the lightguide 102 becoming divergent due to diffraction. For example, the lightguide 102 may be made thinner than 2 mm, 1 mm, or even thinner than 0.5 mm in some cases. A width of the slanted partial bulk reflectors 104 between the first 111 and second 112 opposed outer surfaces of the lightguide may be accordingly less than approximately 2.8, 1.4, or even 0.7 mm. The width dimension is shown in FIG. 1 at 199.

A thin lightguide with relaxed geometrical tolerances of the slanted reflectors and outer surfaces may be considerably cheaper to manufacture. Such a lightguide may be used as a front light or a backlight for a miniature display panel, or in some applications, for a comparatively large display panel. More generally, the illuminator 100 may be used in an illumination application requiring a broad illuminating beam emitted by a low-profile, efficient illuminating source.

Figure 2:
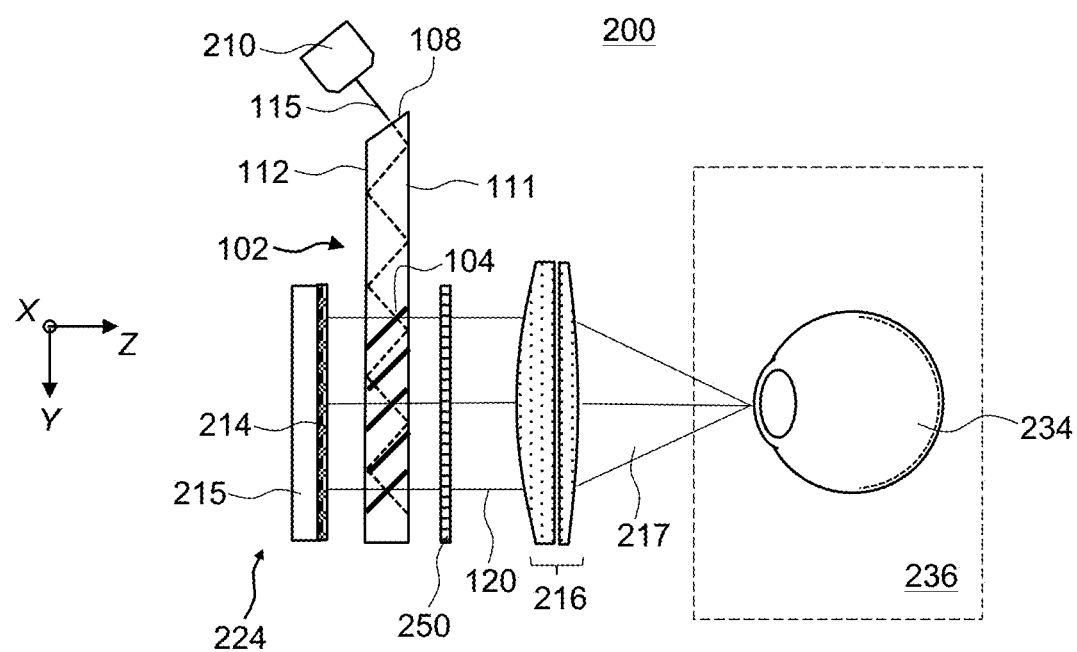
FIG. 2 is a schematic view of a display device of this disclosure, the display device using the illuminator of FIG. 1 for providing light to a reflective display panel.

Uses of the illuminator 100 in display systems will now be described by means of non-limiting illustrative examples. Referring to FIG. 2, the illuminator 100 is used in a display device 200. The display device 200 uses a reflective display panel 224 with a reflective pixel array 214 supported by a substrate 215, and an ocular lens 216. The reflective display panel 224 and the ocular lens 216 are disposed on opposite sides of the illuminator 100. The ocular lens 216 may include a pancake lens, a multi-element refractive lens, a combination of refractive and reflective elements, etc.

In operation, a light source 210 emits the light beam 115. The light beam 115 may be coupled into the illuminator 100 via the slanted in-coupling surface 108. Other in-coupling configurations are also possible, e.g. the ones using a diffraction grating. The in-coupled light beam 115 propagates down the lightguide 102 (along the Y-axis in FIG. 2) by a series of total internal reflections from its outer opposed surfaces 111 and 112. The partial slanted bulk reflectors 104 out-couple the portions 120 of the light beam 115 initially towards the reflective pixel array 214. The portions 120 get reflected by the reflective pixel array 214 to propagate through the lightguide 102 towards the ocular lens 216. The ocular lens 216 forms a generally converging beam 217 at the eyebox 236 of the display device 200.

The ocular lens 216 is configured to convert an image in linear domain displayed by the display panel into an image in angular domain at an eyebox 236 downstream of the ocular lens 216, for observation by a user's eye 234. The term "image is in spatial domain" means an image where pixel coordinates of the image being displayed correspond to XY coordinates of the display pixels. The term "image in angular domain" refers to an image where pixel coordinates of the image being displayed correspond to ray angles of the converging image light at the eyebox. Transmission configurations of a display device with an illuminator of this disclosure are also possible and will be considered further below.

In some embodiments, the reflective pixel array 214 includes a reflective liquid crystal pixel array, e.g. a liquid crystal (LC) on silicon (LCoS) array, having an array of polarization tuning pixels, e.g. polarization rotators or retardation-tunable waveplates capable of controllably tuning polarization of the impinging light. The optical retardation changes when LC molecules reorient in an electric field applied to the LC layer through a set of electrodes. In the embodiment shown in FIG. 2, the partial reflectors 104 are polarization-selective reflectors that reflect light of a first polarization state and transmit light of a second, orthogonal polarization state.

Figure 3:
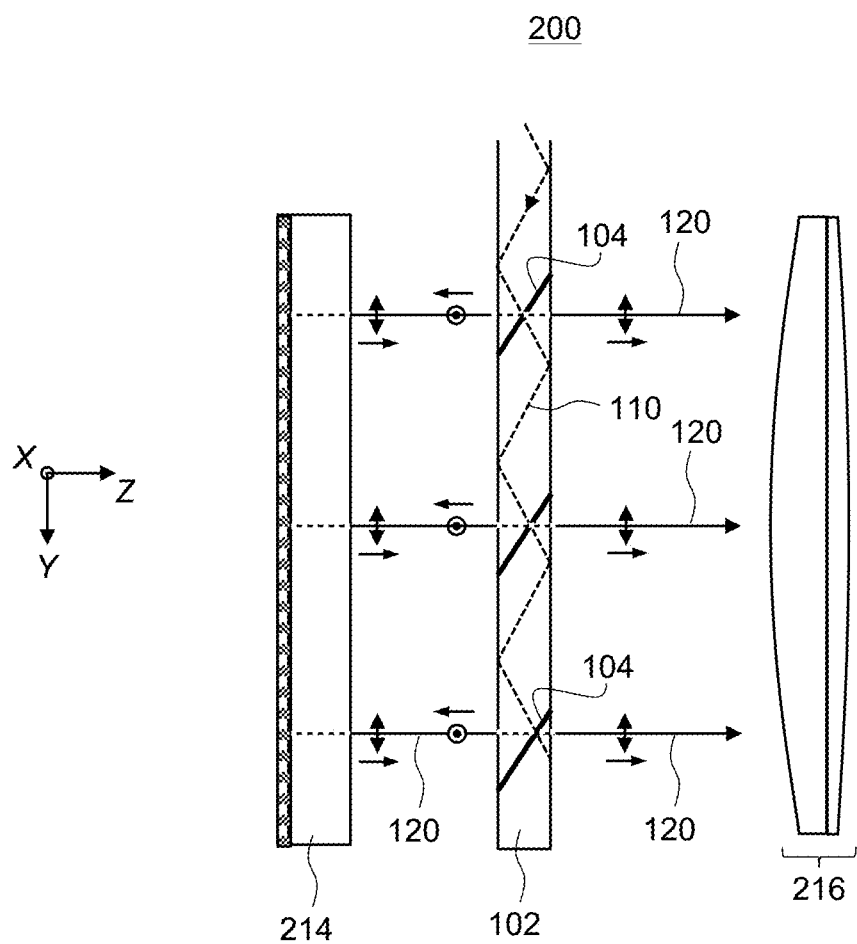
FIG. 3 is a partial cross-sectional view an embodiment of the display device of FIG. 2 showing light propagation paths of light of different polarization states.

The polarization performance of the display device 200 is illustrated in FIG. 3. The light beam 115 propagates along the lightguide 102. The light beam portions 120 are linearly polarized along X-axis, i.e. perpendicular to the plane of FIG. 3. The polarization-selective reflectors 104 operate as a polarizer, polarizing the illuminating light. Pixels of the reflective pixel array 214 tune the polarization of the impinging light beam portions 120, forming a spatial distribution of polarization of reflected light in accordance with an image to be displayed by the display device 200. The reflected light linearly polarized along Y-axis propagates through the polarization-selective reflectors 104 and impinges onto the ocular lens 216. The polarization-selective reflectors 104 now operate as a compound analyzer of the reflected light beam portions 120, forming an image in linear domain (i.e. linear space) that is converted by the ocular lens 216 into an image in angular domain (i.e. angular space) to be observed by a user's eye 234 at the eyebox 236 (FIG. 2). An auxiliary polarizer 250, e.g. a linear transmission polarizer, may be provided downstream of the lightguide 102.

Figure 4A:
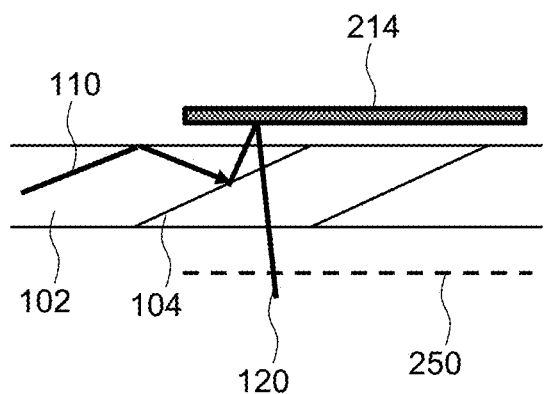
FIGS. 4A to 4D are side schematic views illustrating ghost optical optical paths in the display device of FIGS. 2 and 3.
Figure 4B:
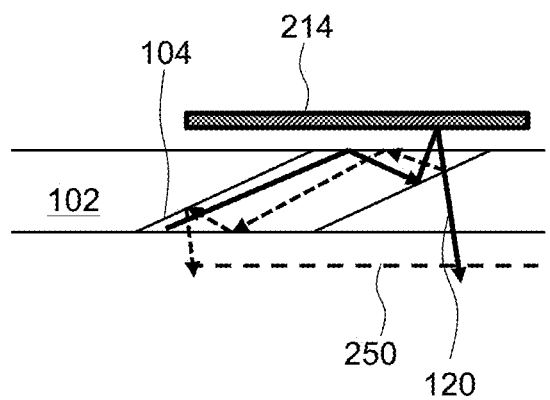
Figure 4C:
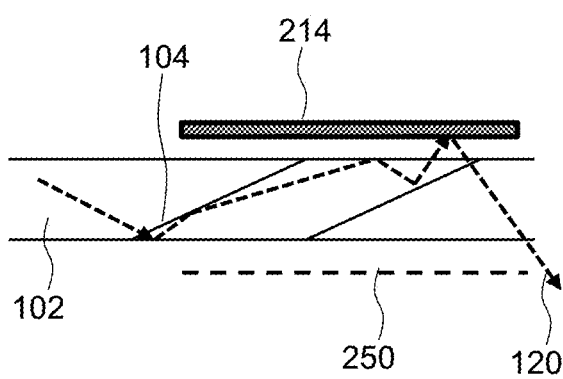
Figure 4D:
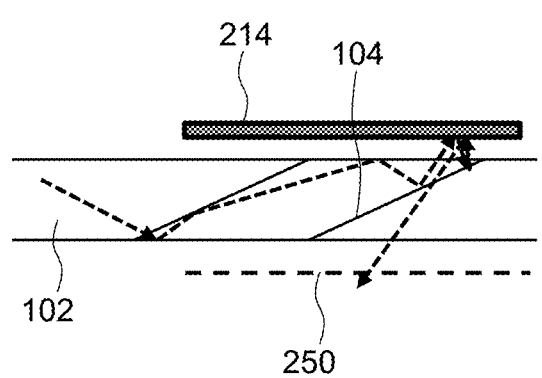

Functions of the auxiliary polarizer 250 will now be explained. Several possible light paths for the reflected light beam portions 120 are illustrated in FIGS. 4A to 4D. FIG. 4A illustrates the proper image-forming light path where the light beam portion 120 is reflected by the partial reflector 104 to impinge onto the reflective pixel array 214, get reflected thereby with change of polarization state dependent on the image brightness value assigned to the reflecting pixel, and propagate towards the ocular lens, not shown. FIG. 4B illustrates a first ghost path for the reflected light beam portions 120, which undergo a second reflection from the partial reflector 104 upon reflecting from the reflective pixel array 214. FIGS. 4C and 4D show two other ghost paths. Out of the three ghost paths of FIGS. 4B, 4C, and 4D, only the ghost path of FIG. 4B has the same beam angle as the beam angle in the main path presented in FIG. 4A. Accordingly, this beam path may create a ghost image at the eyebox 236 (FIG. 2). The other two beam paths are reflected out and generally do not contribute to ghost image formation.

It is to be noted that the light on the ghost beam path of FIG. 4B has a polarization orthogonal to the polarization of the path of FIG. 4A. Accordingly, the auxiliary polarizer 250 will block that ghost path, effectively suppressing ghost image formation. For this to work, the auxiliary polarizer 250 needs to be placed downstream of the illuminator 100, i.e. the illuminator 100 needs to be disposed between the reflective pixel array 214 and the auxiliary polarizer 250. In some embodiments, the auxiliary polarizer 250 may be placed downstream of the ocular lens 216. A second function of the auxiliary polarizer 250 is to operate as an analyzer for converting polarization distribution imparted by the reflective pixel array 214 onto the beam portions 120 into brightness/optical power density distribution. In other words, the auxiliary polarizer 250 shares the analyzer function with the partial reflectors 104.

Referring momentarily back to FIG. 2, when the light beam portions 120 form a parallel output beam, the latter gets focused by the ocular lens 216 into a tight spot, which is centered on the pupil of the user's eye 234. However, tight spots, or small size of exit pupil of the display device 200, may present problem to the viewer including a reduced resolution, pupil swim, unnatural look of smooth white portions of an image to be displayed, eye floaters, etc. So it may be desirable to avoid collimated illuminating beams; rather, the display panel 224 may be illuminated with a light beam having a certain non-zero divergence. This may be achieved e.g. by placing a negative lens between the light source 210 and the in-coupler 106. The negative lens will create a diverging beam at the input, which will also be diverging at the output. Such a solution, however, may create problems related to a non-uniform field of view and speckles e.g. when the light source 210 is a coherent light source. These and other problems may be related to low etendue of the illuminating light beam. The etendue is not increased by inserting a lens into the optical path.

Figure 5A:
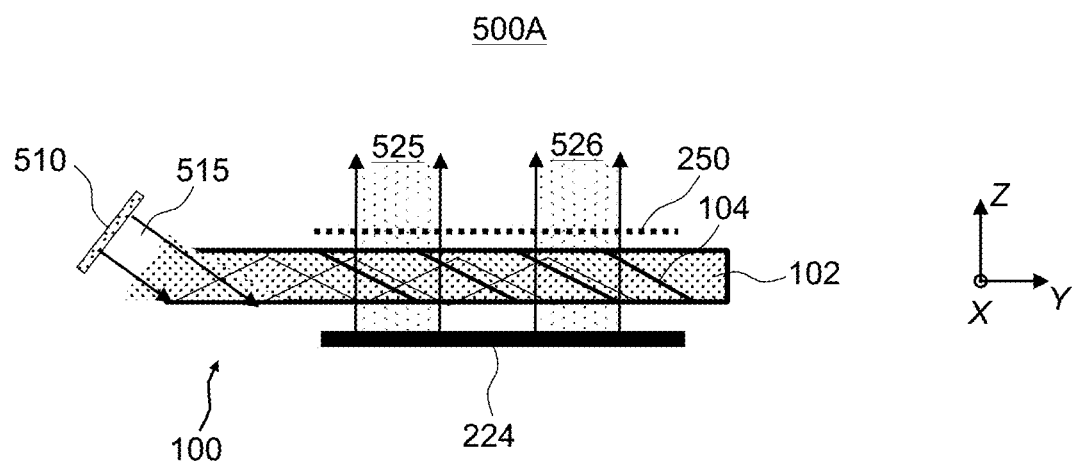
FIGS. 5A and 5B are side cross-sectional views of an illuminator of this disclosure without an upstream diffuser (FIG. 5A) and with an upstream diffuser (FIG.

FIG. 5A illustrates the formation of a parallel output light beam by the illuminator 100 from a parallel input light beam. A display device 500A of FIG. 5A is similar to the display device 200 of FIGS. 2 and 3, and includes similar elements. A light source 510 provides a collimated light beam 515 in-coupled into the lightguide 102 of the illuminator 100. The collimated light beam 515 propagates in the lightguide 102 by a series of internal reflections. The slanted partial bulk reflectors 104 out-couple portions 525 and 526 of the collimated light beam 515 towards the reflective display panel 224, which reflects the collimated light beam portions 525 and 526 to propagate through the lightguide 102 and the auxiliary polarizer 250 as explained above. Only two light beam portions, 525 and 526, are shown for clarity of illustration.

Figure 5B:
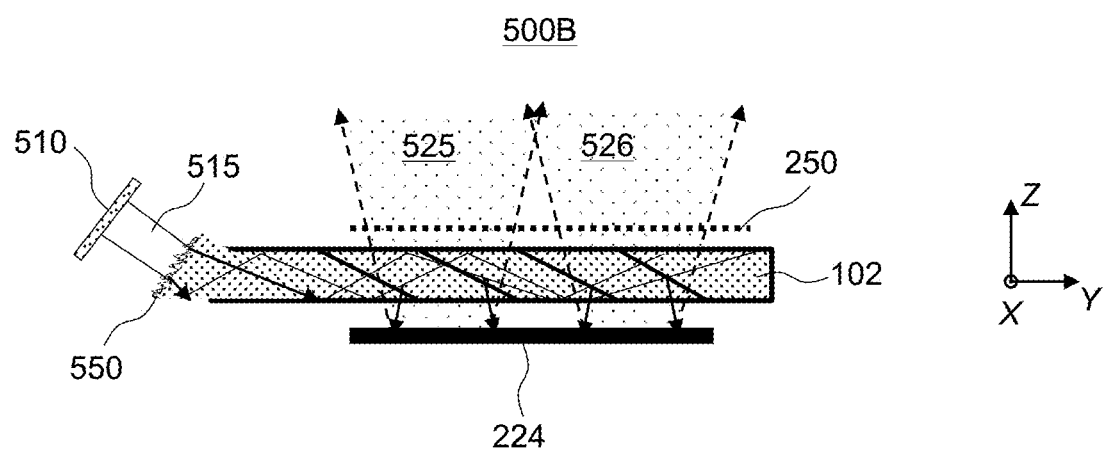

Referring now to FIG. 5B with further reference to FIG. 5A, a display device 500B is similar to the display device 500A of FIG. 5A, and includes similar elements. The display device 500B of FIG. 5B further includes a diffuser 550 upstream of the lightguide 102. The diffuser 550 may be mounted onto the in-coupler 106. The diffuser 550 may be an engineered diffuser scattering the light beam 515 within a pre-defined light cone, for example within a light cone with an apex not exceeding 4 degrees. Since the light beam 515 is expanding, the out-coupled portions 525 and 526 will be also expanding, as illustrated. The diffuser 550 increases etendue of the out-coupled beam portions 525 and 526, resulting in a larger exit pupil size, reduced field of view non-uniformity, and a reduced speckle pattern formation.

Figure 6A:
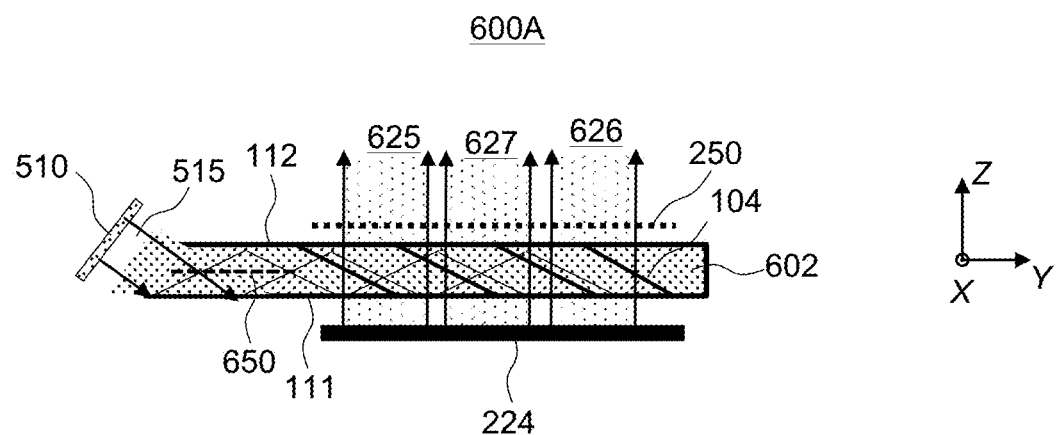
FIG. 6A is a side cross-sectional view of an illuminator of this disclosure with a buried reflector for increasing pupil replication density.

To improve the spatial uniformity of an illuminating light beam, the lightguide of the display panel illuminator may include additional beamsplitters and/or partial reflectors. Turning to FIG. 6A for a non-limiting illustrative example, a display device 600A is similar to the display device 500A of FIG. 5A, and includes similar elements. The display device 600A of FIG. 6A further includes a partial reflector 650, e.g. a translucent mirror, a dielectric coating, etc., buried in the lightguide 102 or in other words disposed within the lightguide 102. The partial reflector 650 (shown as a thick dashed line) is disposed at a distance from and parallel to the first 111 and second 112 opposed outer surfaces in an optical path upstream of the plurality of slanted partial bulk reflectors 104. In some embodiments, the partial reflector 650 is equidistant from the first 111 and second 112 outer surfaces. The partial reflector 650 may also be disposed closer to one of the first 111 and second 112 outer surfaces than the other.

In operation, the partial reflector 650 splits the light beam 515 into a plurality of sub-beam. The net result of this is an increase of the number of the out-coupled beam portions, which causes an increase of the spatial density of the out-coupled light beam portions. In FIG. 6A, three light beam portions 625, 626, 627 are out-coupled by the plurality of slanted partial bulk reflectors 104 from the lightguide 102. Although only three portions are shown, many more overlapping beam portions may be out-coupled, forming a continuous broad uniform illuminating light beam.

Figure 6B:
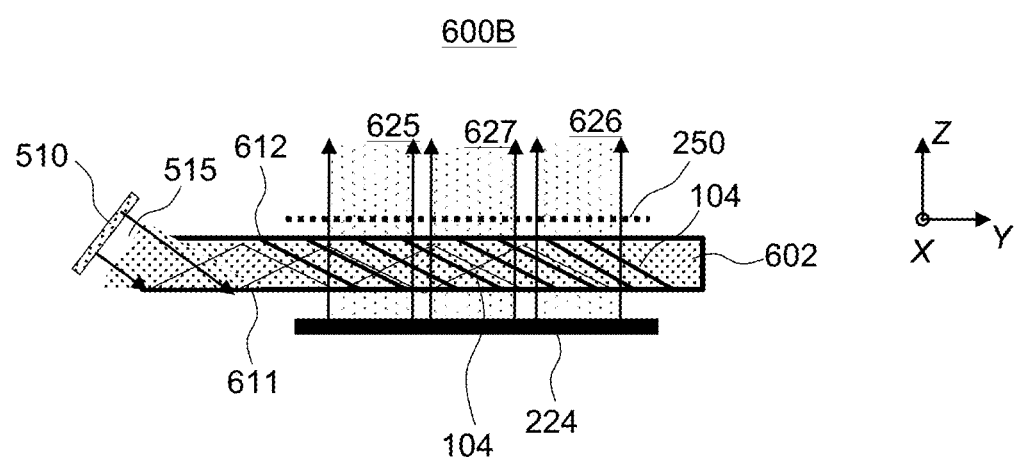
FIG. 6B is a side cross-sectional view of an illuminator of this disclosure with an increased density of slanted mirrors for increasing pupil replication density.
Figure 6C:
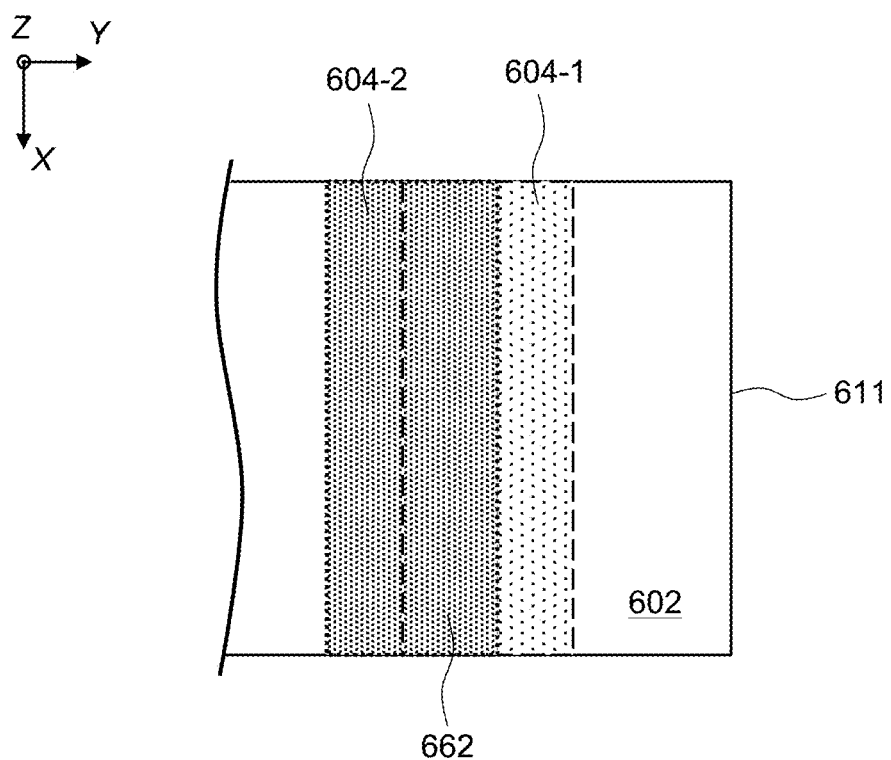
FIG. 6C is a magnified plan view of the illuminator of FIG. 6B showing the overlap of slanted bulk reflectors in the lightguide of the illuminator.

Referring now to FIG. 6B, a display device 600B is similar to the display device 500A of FIG. 5A, and includes similar elements. The display device 600B of FIG. 6B has a lightguide 602 similar to the lightguide 102 of FIGS. 1-3, FIGS. 5A, 5B, and 6A, in that the lightguide 602 includes a plurality of the slanted partial bulk reflectors 104 inside the lightguide 602. One difference of the lightguide 602 of FIG. 6B is that in the lightguide 602, the density of the slanted partial bulk reflectors 104 is sufficiently high for the projections of the onto first 611 and second 612 outer surfaces of the lightguide 602 to overlap one another. This is illustrated in more detail in FIG. 6C, where orthogonal projections of adjacent slanted partial bulk reflectors 604-1 and 604-2 onto the first surface 611 (parallel to the XY plane and the plane of FIG. 6C) overlap one another, forming an overlapping area 662.

In some embodiments of illuminator based on a geometrical waveguide of tis disclosure, the waveguide may include two sets of slanted partial bulk reflectors for expanding the light beam along two perpendicular directions. Referring for a non-limiting illustrative example to FIGS. 7A and 7B, an illuminator 700 includes a lightguide 702, which may propagate a light beam 715 emitted by a light source 710 along a length dimension (i.e. along Y-axis in FIGS. 7A and 7B) and along a width dimension (i.e. along X-axis in FIGS. 7A and 7B) of the lightguide 702 by a series of internal reflections from first 711 and second 712 outer surfaces of the lightguide 702 separated by a lightguide thickness measured along Z-axis in FIGS. 7A and 7B.

The illuminator 700 includes two pluralities of slanted partial bulk reflectors inside the lightguide 702: a first plurality including partial bulk reflectors 704 tilted about X-axis and a second plurality including partial bulk reflectors 705 tilted about Z-axis. The slanted partial bulk reflectors 704 of the first plurality expand the light beam 715 along the Y-axis, and the slanted partial bulk reflectors 705 of the second plurality expand the light beam 715 along the X-axis. In the embodiment shown, the illuminator 700 further includes a tiltable reflector 760 in an optical path upstream of the lightguide 702 for varying an angle of incidence of the light beam 715 onto an in-coupler 706 of the lightguide 702. The tiltable reflector 760 may be, for example, a microelectromechanical system (MEMs) tiltable reflector. A buried translucent or partial reflector 750 may also be provided for splitting the light beam before the light beam 715 impinges onto any slanted reflector. The function of a partial reflector has been explained above with reference to FIG. 6A.

Figure 7A:
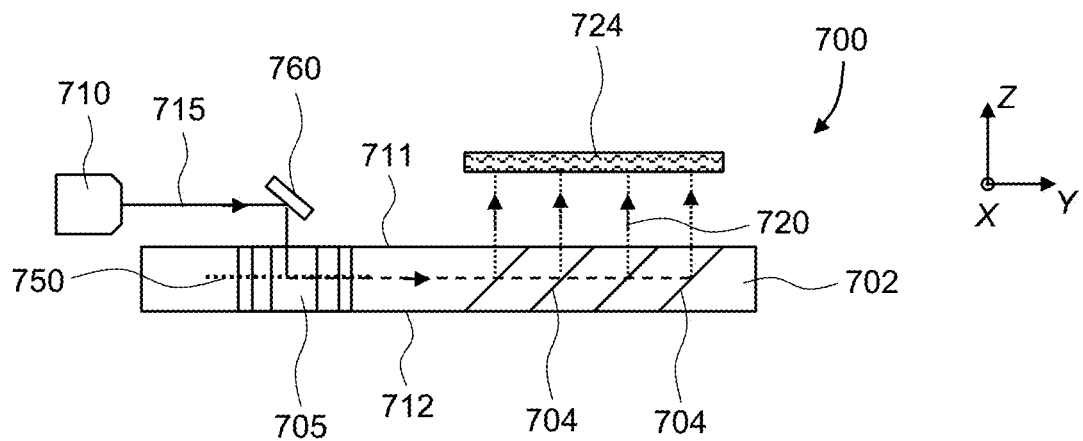
FIGS. 7A and 7B are side and plan views, respectively, of an illuminator of this disclosure with two sets of slanted reflectors and a tiltable reflector at the input.
Figure 7B:
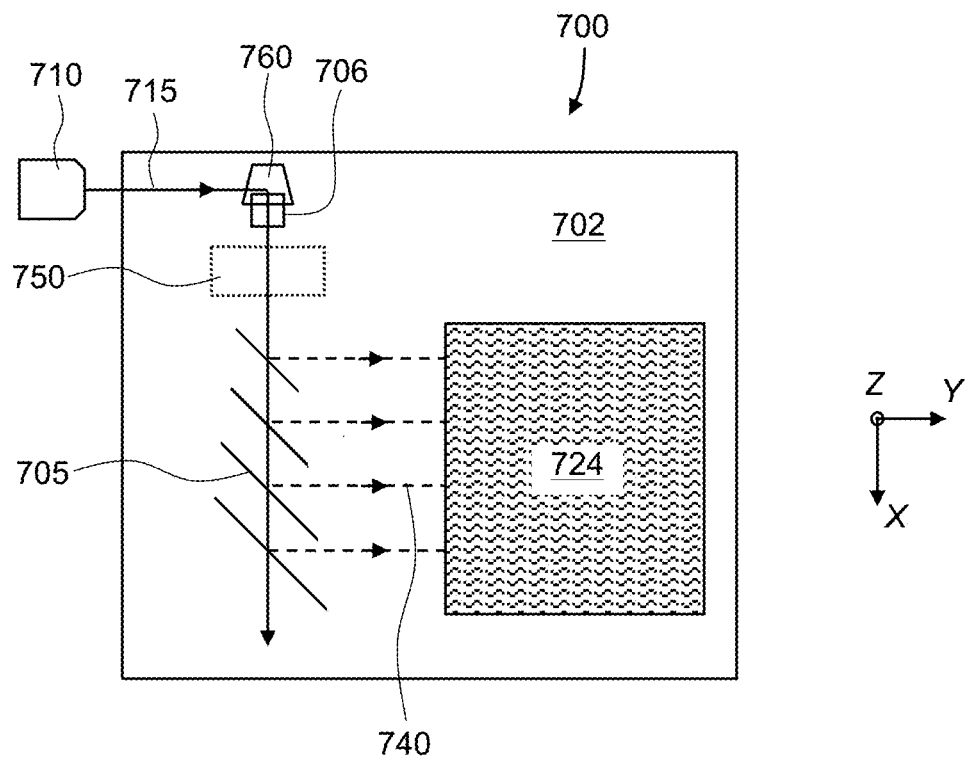
Figure 8:
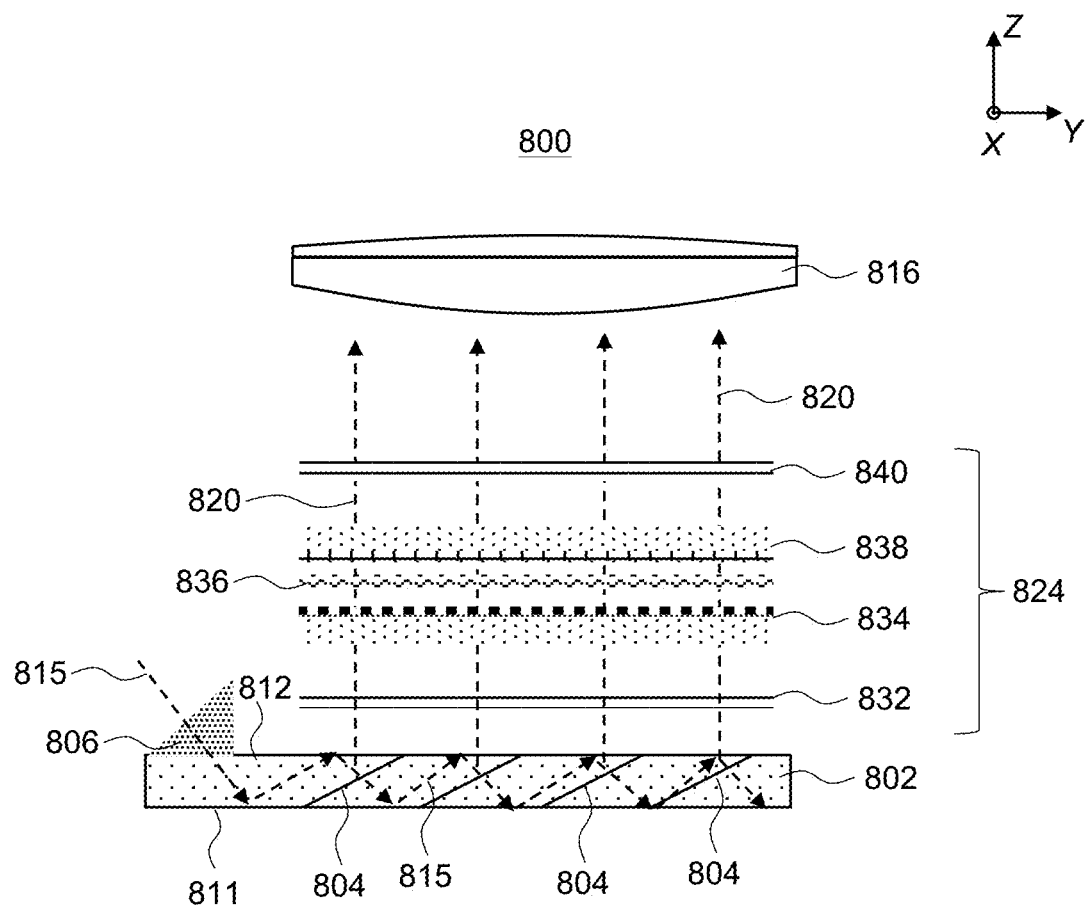
FIG. 8 is an exploded side view of a display device using an illuminator of this disclosure, the illuminator providing illuminating light to a transmissive display panel.

Still referring to FIGS. 7A and 7B, the light beam 715 emitted by the light source 710 is redirected by the tiltable reflector 760 to impinge onto the in-coupler 706, which couples the light beam 715 into the lightguide 702. The light beam 715, which may be split by the optional partial reflector 750, impinges onto the slanted partial bulk reflectors 705 of the second plurality of reflectors, which expand the light beam 715 along the width dimension of the lightguide (i.e. along X-axis) to obtain an expanded light beam 740, which is directed towards the slanted partial bulk reflectors 704 of the first plurality of reflectors. The slanted partial bulk reflectors 704 out-couple portions 720 of the light beam 715 along the length dimension of the lightguide (i.e. along Y-axis) through the first surface 711. The out-coupled light beam portions 720 form a wide output light beam for illuminating a display panel 724.

An illuminator based on a geometrical waveguide of this disclosure may be used to illuminate not only a reflective but also a transmissive display panel, i.e. to operate as a backlight for the transmissive panel. Referring for a non-limiting illustrative example to FIG. 8, a display device 800 includes a transmissive display panel 824 shown in an exploded view, and a lightguide 802 operating as a backlight for the transmissive display panel 824. The lightguide 802 includes opposed first 811 and second 812 outer surfaces for guiding a light beam 815 in-coupled by an in-coupler 806 into the lightguide 802, and a plurality of slanted bulk reflectors 804 extending between the first 811 and second 812 surfaces at an acute angle to the first 811 and second 812 surfaces, for reflecting portions 820 of the light beam 815 out of the lightguide 802 to impinge onto the display panel 824. The display panel 824 spatially modulates the light beam portions 820 to provide an image in linear domain. The in-coupler 806 may be e.g. a prismatic in-coupler, a diffraction grating in-coupler, etc. The slanted bulk reflectors 804 may be polarization-selective reflectors reflecting light of a first linear polarization and transmitting light of a second, orthogonal polarization.

The display device 800 further includes an image forming optic such as an ocular lens 816. By way of non-limiting examples, the ocular lens 816 may include a refractive lens, a reflector, a catadioptric lens, a pancake lens, etc. The function of the ocular lens 816 is to convert the image in linear domain formed by the display panel 824 into an image in angular domain, and to convey the image in angular domain to an eyebox of the display device 800 disposed downstream of the ocular lens 816, for direct observation of the image by a user's eye at the eyebox.

In the embodiment shown, the display panel 824 includes a cleanup linear transmission polarizer 832, a bottom substrate 834 such as a thin film transistor (TFT) substrate for example, a liquid crystal (LC) layer 836, a top substrate 808 including e.g. a black grid defining the array of pixels and an optional color filter array, and an analyzer 840, which may be a linear transmissive polarizer. The cleanup 832 and analyzer 840 polarizers may be laminated onto the respective bottom 834 and top 838 substrates. In operation, the light beam portions 820 reflected by the plurality of slanted polarization-selective reflectors 804 propagate through the transmissive display panel 824, get spatially modulated thereby via spatially-variant polarization transformation by the LC layer 836, and impinge onto the ocular lens 816 with forms an image to be observed.

Figure 9:
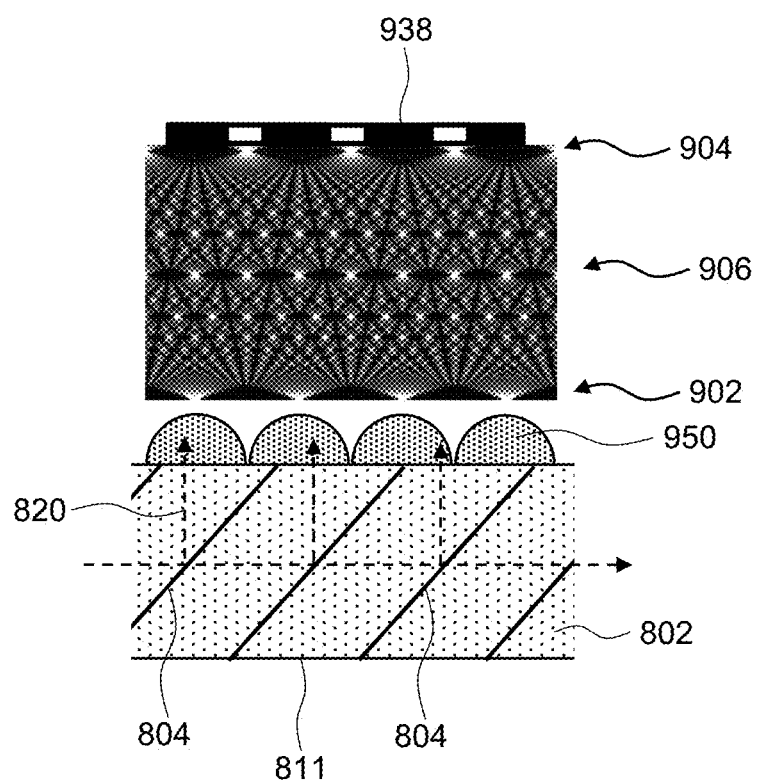
FIG. 9 is a magnified cross-sectional view of an embodiment of the display device of FIG. 8 using Talbot effect to illuminate the pixel array of the transmissive display panel with an array of illuminating light spots at a depth within the transmissive display panel.

In some embodiments, the illuminating light may be patterned, i.e. focused into an array of optical power density peaks, to matched the pattern of the pixel array of the transmissive display panel 824, thereby increasing optical throughput and overall plug efficiency of the display device 800. Referring now to FIG. 9 with further reference to FIG. 8, a focusing element 950, e.g. a microlens array, may be added to the display device 800 of FIG. 8 for forming an array of light spots 902 from the out-coupled light portions 820 downstream of the focusing element 950. The array of light spots 902 is shown as concentrated white spots over the focusing element 950. In operation, an array of optical power density peaks 904 is formed at the transmissive pixel array due to an optical effect known as Talbot effect. A Talbot pattern 906 of illuminating light is formed on an optical path between the focusing element 950 and a black grid 938 defining the transmissive pixel array, including the cleanup polarizer 832, the bottom substrate 834, and the LC layer 836. The array of optical power density peaks 904 is shown as concentrated white spots at the top of the Talbot pattern 906 under the black grid 938.

Embodiments of the focusing element 950 may include, for example, an array of refractive microlenses, an array of diffractive microlenses, an array of liquid crystal microlenses, an array of Pancharatnam—Berry phase (PBP) microlenses, etc. More generally, the focusing element 950 may include a phase/amplitude mask that performs the function of a microlens array, i.e. focusing an output beam formed by the out-coupled beam portions 820 into an array of spots coordinated with the pixel array. The phase/amplitude mask may include e.g. an LC layer with a spatially variable LC orientation, a patterned LC polymer, or a nanostructure having a spatially varying height.

Figure 10:
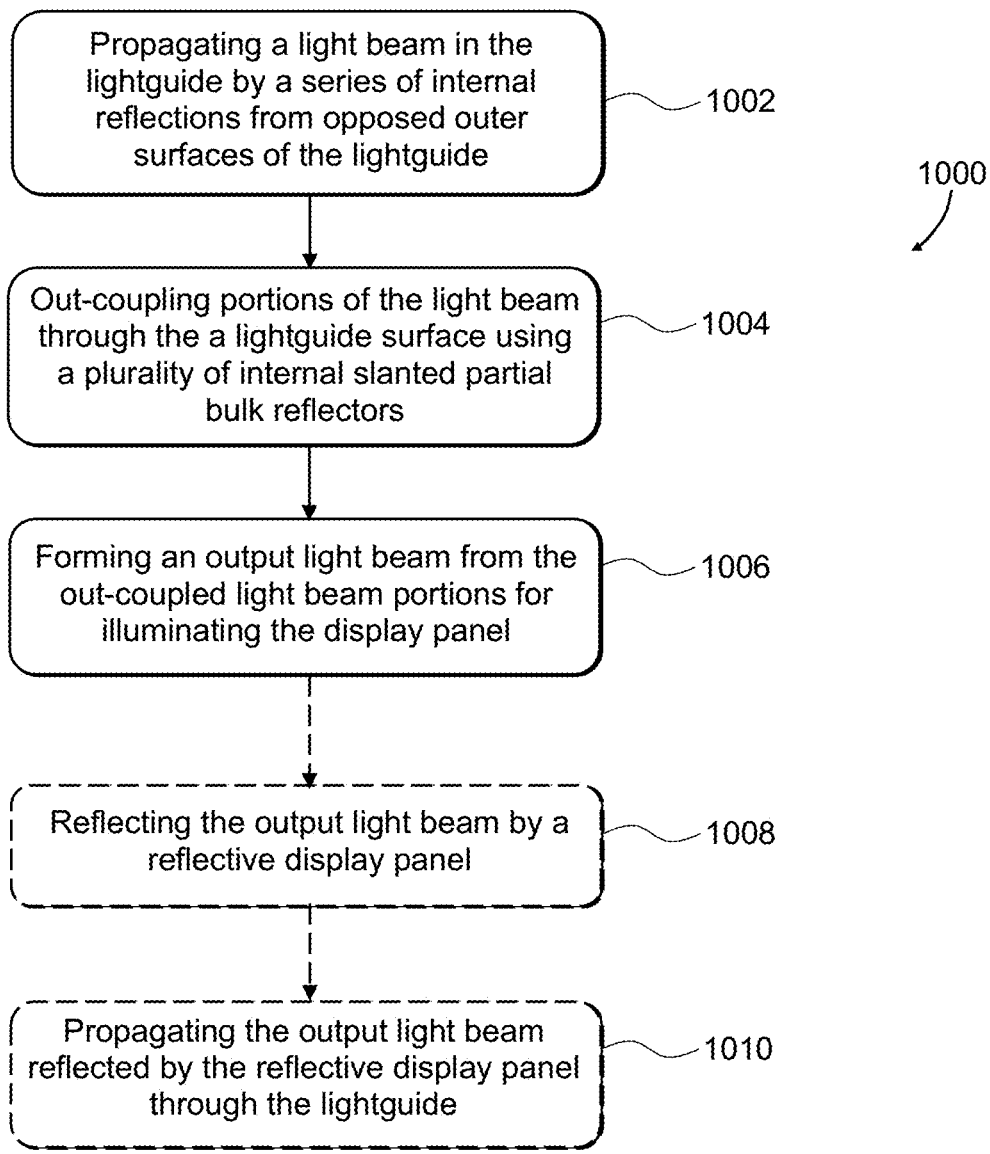
FIG. 10 is a flow chart of a method of this disclosure for illuminating a display panel.

Referring to FIG. 10, a method 1000 for illuminating a display panel includes propagating (1002) a light beam in a lightguide of this disclosure, for example a geometrical waveguide including a plurality of slanted partial bulk reflectors inside the lightguide. The light beam is propagated along a length dimension of the lightguide by a series of internal reflections from first and second opposed outer surfaces of the lightguide. Portions of the light beam are out-coupled (1004) along the length dimension of the lightguide through the first surface by reflections from the plurality of slanted partial bulk reflectors inside the lightguide. An output light beam is formed (1006) from the out-coupled light beam portions for illuminating the display panel.

The method 1000 may be used for illuminating both reflective and transmissive display panels. For reflective display panels, the method may further include reflecting (1008) the output light beam by the reflective display panel. Upon reflection, the output light beam is spatially modulated in at least one of amplitude, phase, or polarization, depending upon the display panel type, so as to form an image in linear domain. The spatially modulated reflected light beam may then be propagated (1010) through the lightguide to impinge onto an image-forming optical assembly such as an ocular lens, for example. The ocular lens may form an image in angular domain from the image in linear domain provided by the reflective display panel.

Figure 11:
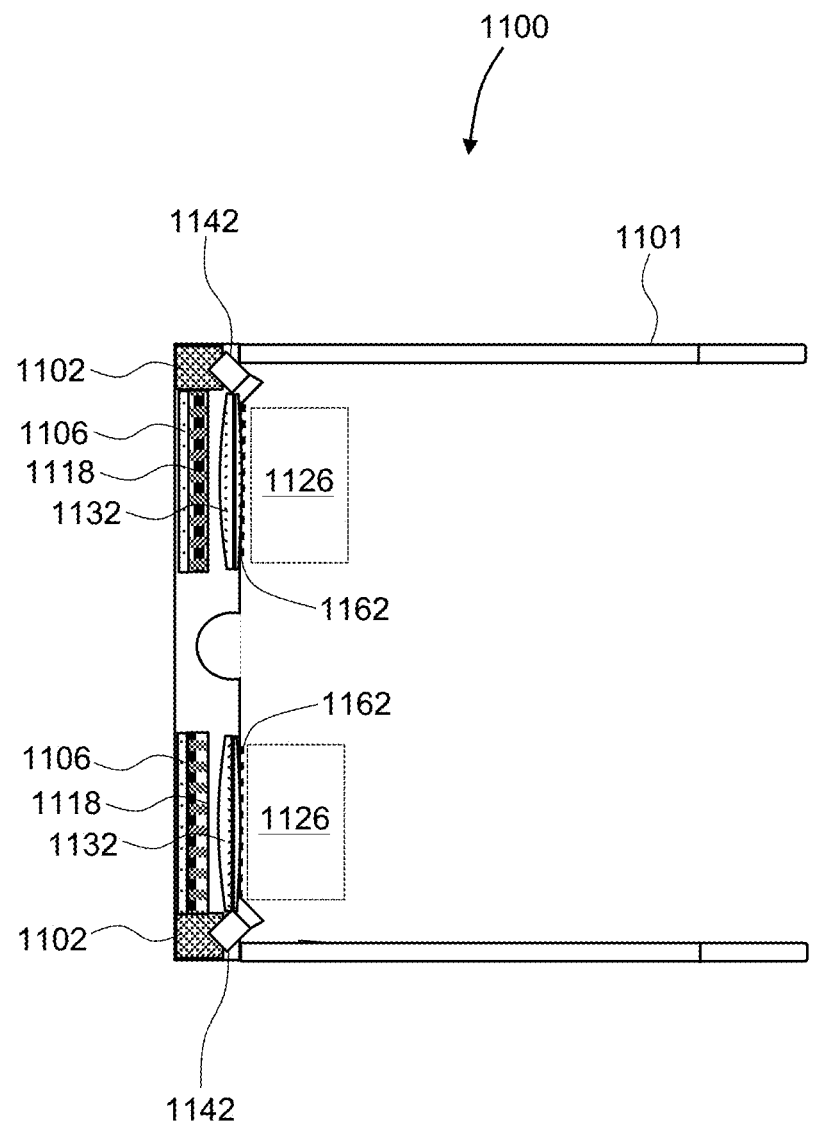
FIG. 11 is a view of an augmented reality (AR) display of this disclosure having a form factor of a pair of eyeglasses.

Turning to FIG. 11, a virtual reality (VR) near-eye display 1100 includes a frame 1101 supporting, for each eye: a light source 1102; an illuminator 1106 operably coupled to the light source 1102 and including any of the illuminators disclosed herein; a display panel 1118 including an array of display pixels; and an ocular lens 1132 for converting the image in spatial domain generated by the display panel 1118 into an image in angular domain for direct observation at an eyebox 1126. A plurality of eyebox illuminators 1162, shown as black dots, may be placed onto the side of the waveguide illuminator 1106 facing the eyebox 1126. An eye-tracking camera 1142 may be provided for each eyebox 1126.

The purpose of the eye-tracking cameras 1142 is to determine position and/or orientation of both eyes of the user. The eye location and orientation information may be used to steer the exit pupils of the VR near-eye display 1100 to the eye pupil location e.g. using the tiltable reflector 760 depicted in FIGS. 7A and 7B. The eyebox illuminators 1162 illuminate the eyes at the corresponding eyeboxes 1126, allowing the eye-tracking cameras 1142 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1162, the latter may be made to emit light invisible to the user. For example, infrared light may be used to illuminate the eyeboxes 1126.

Figure 12:
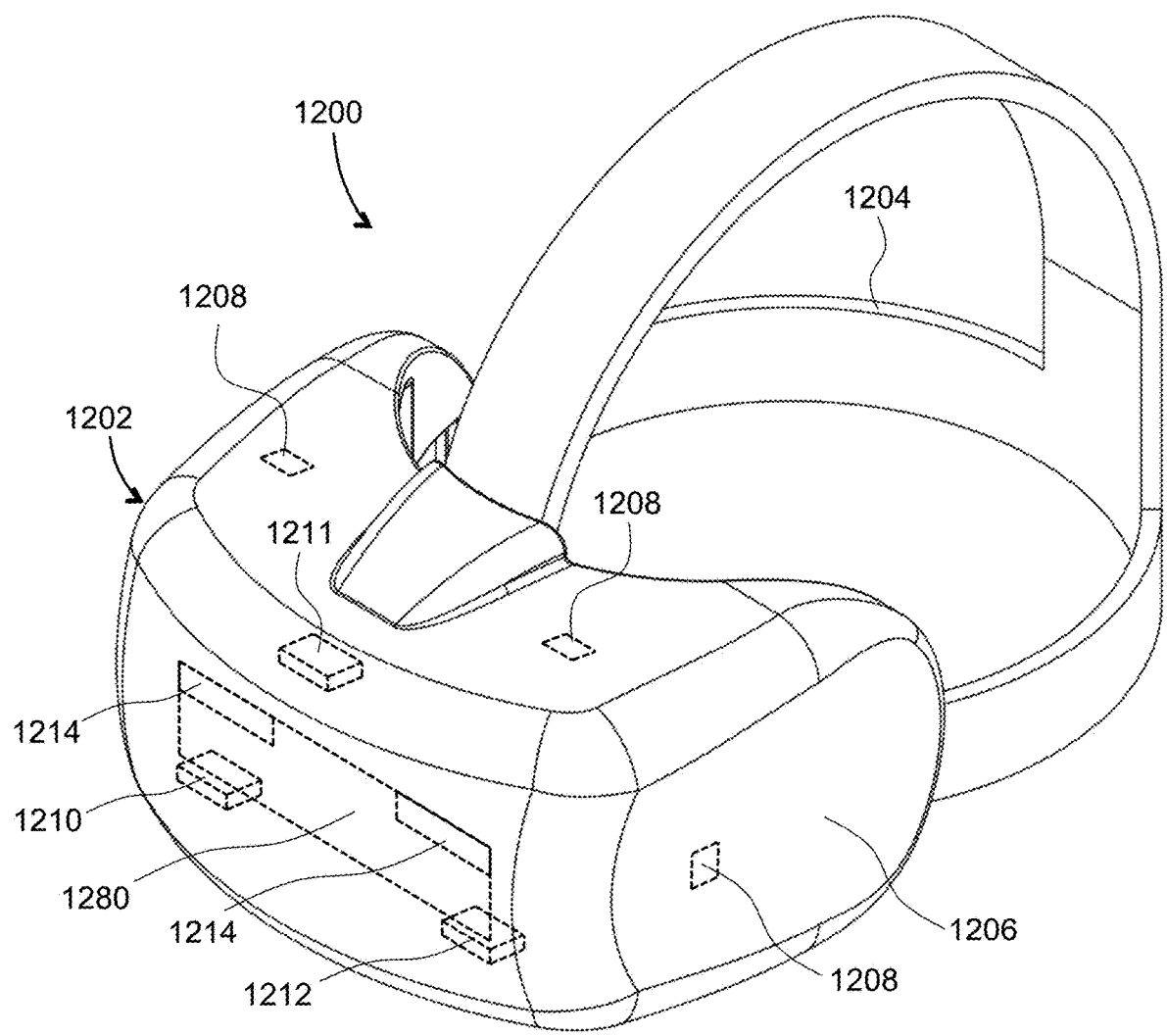
FIG. 12 is a three-dimensional view of a head-mounted display (HMD) of this disclosure.

Turning to FIG. 12, an HMD 1200 is an example of an AR/VR wearable display system which encloses the user's face, for a greater degree of immersion into the AR/VR environment. The HMD 1200 may generate the entirely virtual 3D imagery. The HMD 1200 may include a front body 1202 and a band 1204 that can be secured around the user's head. The front body 1202 is configured for placement in front of eyes of a user in a reliable and comfortable manner. A display system 1280 may be disposed in the front body 1202 for presenting AR/VR imagery to the user. The display system 1280 may include any of the display devices and illuminators disclosed herein. Sides 1206 of the front body 1202 may be opaque or transparent.

In some embodiments, the front body 1202 includes locators 1208 and an inertial measurement unit (IMU) 1210 for tracking acceleration of the HMD 1200, and position sensors 1212 for tracking position of the HMD 1200. The IMU 1210 is an electronic device that generates data indicating a position of the HMD 1200 based on measurement signals received from one or more of position sensors 1212, which generate one or more measurement signals in response to motion of the HMD 1200. Examples of position sensors 1212 include: one or more accelerometers, one or more gyroscopes, one or more magnetometers, another suitable type of sensor that detects motion, a type of sensor used for error correction of the IMU 1210, or some combination thereof. The position sensors 1212 may be located external to the IMU 1210, internal to the IMU 1210, or some combination thereof.

The locators 1208 are traced by an external imaging device of a virtual reality system, such that the virtual reality system can track the location and orientation of the entire HMD 1200. Information generated by the IMU 1210 and the position sensors 1212 may be compared with the position and orientation obtained by tracking the locators 1208, for improved tracking accuracy of position and orientation of the HMD 1200. Accurate position and orientation is important for presenting appropriate virtual scenery to the user as the latter moves and turns in 3D space.

The HMD 1200 may further include a depth camera assembly (DCA) 1211, which captures data describing depth information of a local area surrounding some or all of the HMD 1200. The depth information may be compared with the information from the IMU 1210, for better accuracy of determination of position and orientation of the HMD 1200 in 3D space.

The HMD 1200 may further include an eye tracking system 1214 for determining orientation and position of user's eyes in real time. The obtained position and orientation of the eyes also allows the HMD 1200 to determine the gaze direction of the user and to adjust the image generated by the display system 1280 accordingly. The determined gaze direction and vergence angle may be used to adjust the display system 1280 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An illuminator for a display panel, the illuminator comprising:
   a lightguide configured to propagate a light beam along a length dimension of the lightguide by a series of internal reflections from first and second opposed outer surfaces of the lightguide, wherein the first and second surfaces are separated by a lightguide thickness dimension perpendicular to the length dimension; a first plurality of slanted partial bulk reflectors inside the lightguide configured to out-couple portions of the light beam along the length dimension of the lightguide through the first surface, the out-coupled light beam portions forming an output light beam for illuminating the display panel; and
   a diffuser upstream of the lightguide and configured to scatter the light beam within a pre-defined light cone having an apex angle no greater than four degrees.

2. The illuminator of claim 1, wherein the slanted partial reflectors of the first plurality comprise polarization-selective reflectors configured to reflect light at a first polarization and transmit light at a second, orthogonal polarization.

3. The illuminator of claim 2, further comprising a linear transmission polarizer disposed proximate the second surface of the lightguide and configured to transmit light at the second polarization.

4. The illuminator of claim 1, wherein the slanted partial bulk reflectors extend from the first surface to the second surface of the lightguide.

5. The illuminator of claim 1, further comprising a partial reflector buried in the lightguide and disposed at a distance from and parallel to the first and second opposed outer surfaces in an optical path upstream of the first plurality of slanted partial bulk reflectors, wherein the partial reflector is configured to split the light beam to increase a spatial density of the light beam portions out-coupled by the first plurality of slanted partial bulk reflectors from the lightguide.

6. The illuminator of claim 1, further comprising a second plurality of slanted partial bulk reflectors disposed inside the lightguide upstream of the first plurality of slanted partial bulk reflectors, wherein the second plurality of slanted partial bulk reflectors is configured to expand the light beam along a width dimension of the lightguide to obtain an expanded light beam and to direct the expanded light beam towards the first plurality of slanted partial bulk reflectors.

7. The illuminator of claim 1, further comprising a tiltable reflector in an optical path upstream of the lightguide, wherein the tiltable reflector is configured to vary an angle of incidence of the light beam onto the lightguide.

8. The illuminator of claim 1, wherein
   a reflectivity of at least some of the slanted partial bulk reflectors of the first plurality is greater than 50%.

9. The illuminator of claim 1, wherein the slanted partial bulk reflectors of the first plurality are parallel to one another to within 0.5 degrees, and wherein at least some of the slanted partial bulk reflectors of the first plurality are angled with respect to each other by at least 0.2 degrees.

10. The illuminator of claim 1, wherein the lightguide thickness is less than 0.5 mm.

11. The illuminator of claim 1, wherein a width of the slanted partial bulk reflectors of the first plurality between the first and second opposed outer surfaces of the lightguide is less than 0.7 mm.

12. A display device comprising:
    a display panel comprising a substrate and a pixel array supported by the substrate;
    a lightguide configured to illuminate the pixel array of the display panel, the lightguide comprising opposed first and second outer surfaces for guiding a light beam in the lightguide and a plurality of slanted partial bulk reflectors extending between the first and second surfaces at an acute angle thereto and configured to reflect, portions of the light beam out of the lightguide to impinge onto the pixel array of the display panel; and
    a focusing element configured to form, downstream of the focusing element, an array of light spots from the portions of the light beam reflected out of the lightguide, such that in operation, an array of optical power density peaks is formed at the pixel array due to Talbot effect.

13. The display device of claim 12, further comprising an ocular lens downstream of the pixel array, wherein the ocular lens is configured to convert an image in spatial domain displayed by the display panel into an image in angular domain downstream of the ocular lens, for observation by a user's eye downstream of the ocular lens.

14. The display device of claim 13, wherein:
    the pixel array is a reflective pixel array; and
    the lightguide is disposed between the display panel and the ocular lens;
    wherein in operation, the light beam portions reflected by the plurality of slanted partial bulk reflectors impinge onto the reflective pixel array, get reflected thereby, propagate back through the lightguide, and impinge onto the ocular lens.

15. The display device of claim 14, wherein:
    the reflective pixel array is configured to controllably tune polarization of the impinging light beam portions from a first polarization state to a second, orthogonal polarization state; and
    the slanted reflectors are polarization-selective and configured to reflect light in the first polarization state and to transmit light in the second polarization state.

16. The display device of claim 14, further comprising a linear transmission polarizer between the lightguide and the ocular lens.

17. The display device of claim 13, wherein:
    the pixel array comprises a transmissive pixel array; and
    the display panel is disposed between the lightguide and the ocular lens;
    wherein in operation, the light beam portions reflected by the plurality of slanted partial bulk reflectors propagate through the substrate, through the transmissive pixel array, and impinge onto the ocular lens.

18. The display device of claim 12, wherein at least one of:
    a thickness of the lightguide is less than 0.5 mm; or
    a width of the slanted partial bulk reflectors between the opposed first and second outer surfaces of the lightguide is less than 0.7 mm.

19. A method for illuminating a display panel, the method comprising:
    propagating a light beam in a lightguide along a length dimension by a series of internal reflections from first and second opposed outer surfaces of the lightguide;
    out-coupling portions of the light beam along the length dimension of the lightguide through the first surface using a plurality of slanted partial bulk reflectors inside the lightguide; and forming an output light beam from the out-coupled light beam portions for illuminating the display panel, wherein at least one of:
- a thickness of the lightguide is less than 0.5 mm; or
- a width of the slanted partial bulk reflectors between the opposed first and second outer surfaces of the lightguide is less than 0.7 mm.

20. The method of claim 19, wherein the display panel is a reflective display panel, the method further comprising:

reflecting the output light beam by the reflective display panel; and propagating the output light beam reflected by the reflective display panel through the lightguide.

\* \* \* \* \*